United States Patent [19]

Dissmeyer et al.

[11] 4,417,498
[45] Nov. 29, 1983

[54] FIRING MECHANISM FOR ROCKET LAUNCHERS

[75] Inventors: Dean E. Dissmeyer, Claremont; David F. Mohlman, Fullerton, both of Calif.

[73] Assignee: General Dynamics, Pomona Division, Pomona, Calif.

[21] Appl. No.: 301,610

[22] Filed: Sep. 14, 1981

[51] Int. Cl.³ ............................................. F41F 3/04
[52] U.S. Cl. ................................. 89/1.814; 89/1.816
[58] Field of Search ............... 89/1.814, 1.813, 1.807, 89/1.816, 1.8

[56] References Cited

U.S. PATENT DOCUMENTS

| | | | |
|---|---|---|---|
| 2,972,933 | 2/1961 | Guthrie | 89/1.814 |
| 3,122,059 | 2/1964 | Choate | 89/1.813 |
| 3,256,777 | 6/1966 | Choate | 89/1.813 |
| 3,371,578 | 6/1966 | Choate | 89/1.813 |
| 3,750,529 | 8/1973 | Reed | 89/1.8 |
| 3,786,717 | 1/1974 | Vickers | 89/1.814 |
| 3,960,054 | 6/1976 | Looger | 89/1.816 |
| 3,969,827 | 7/1976 | Ellis | 33/255 |
| 3,990,355 | 11/1976 | Looger | 89/1.816 |
| 4,091,710 | 5/1978 | Lienau | 89/1.814 |
| 4,092,899 | 6/1978 | Lienau | 89/1.813 |
| 4,095,508 | 6/1978 | Lienau | 89/1.814 |
| 4,164,888 | 8/1979 | Looger et al. | 89/1.814 |

*Primary Examiner*—David H. Brown
*Attorney, Agent, or Firm*—Neil F. Martin; John R. Lindsay; Edward B. Johnson

[57] ABSTRACT

A firing mechanism for portable rocket launchers that includes a percussion activated thermal battery to supply electrical power for arming the warhead and igniting the motor of the rocket contained within the launcher. The energy to activate the thermal battery is not available until a firing pin spring is compressed by the opening of the firing mechanism cover preparatory to firing, and the output of the battery is isolated from the rocket by a normally open electrical switch that is not closed until the trigger mechanism moves to initiate the activation sequence. A safety plate physically blocks movement of the battery firing pin and trigger until positioned by the operator. The trigger and safety plate are arranged for single handed operation while at the same time maintaining a firm grip on the firing mechanism in aiming and firing the rocket launcher.

8 Claims, 12 Drawing Figures

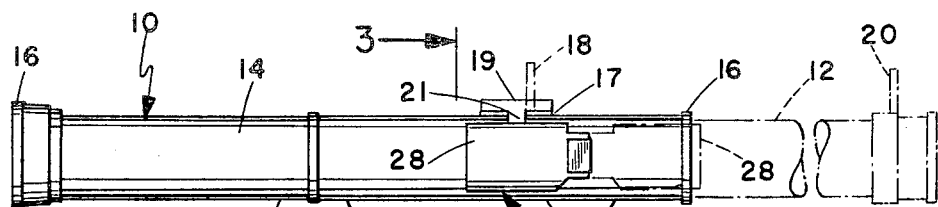
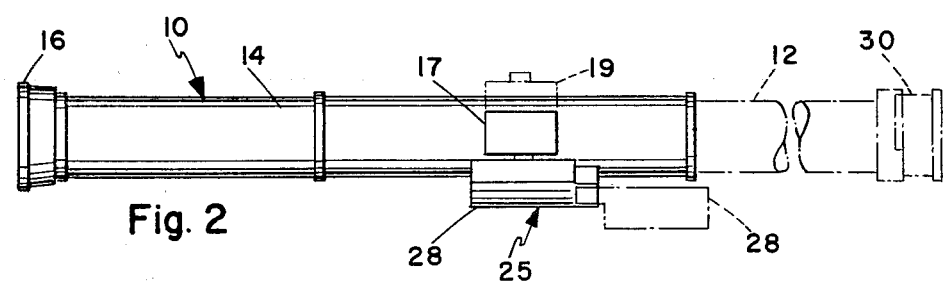
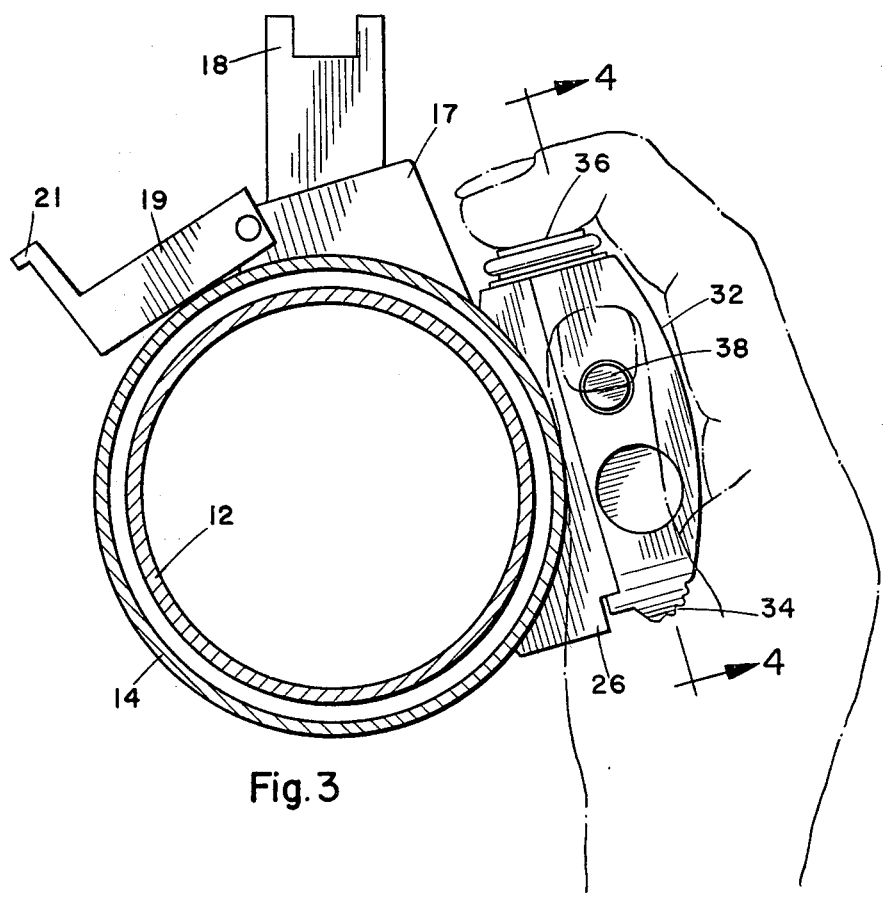

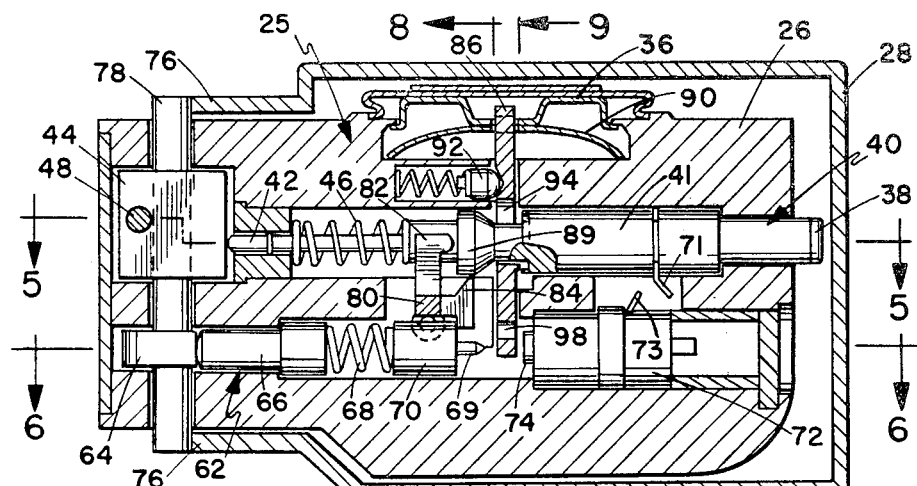
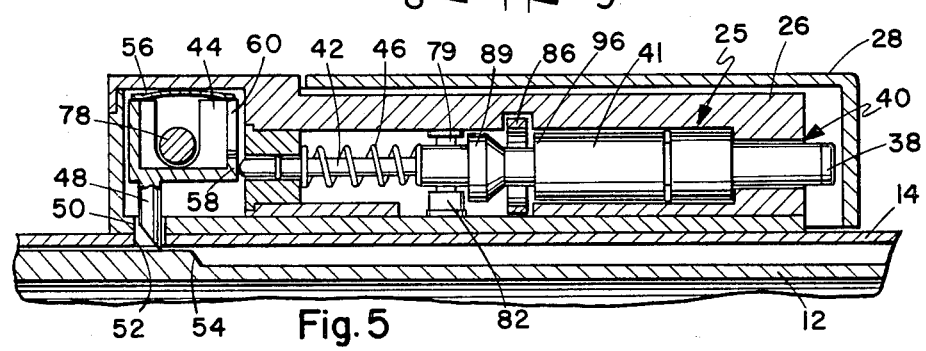
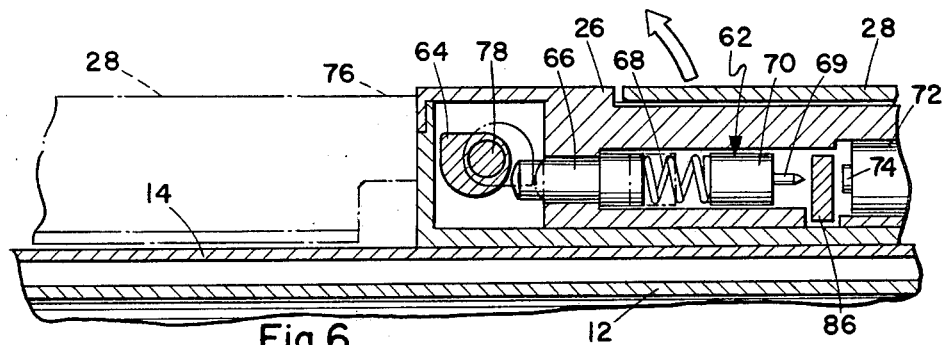
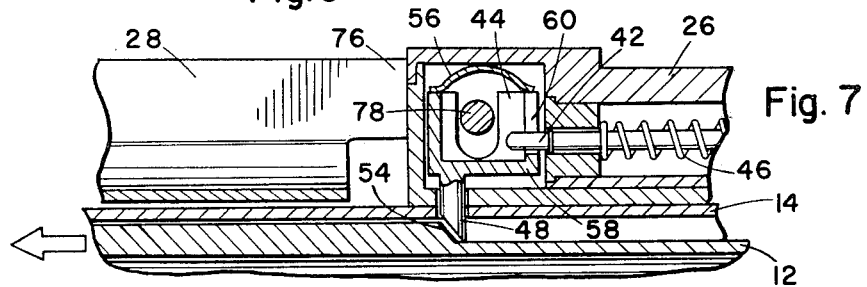

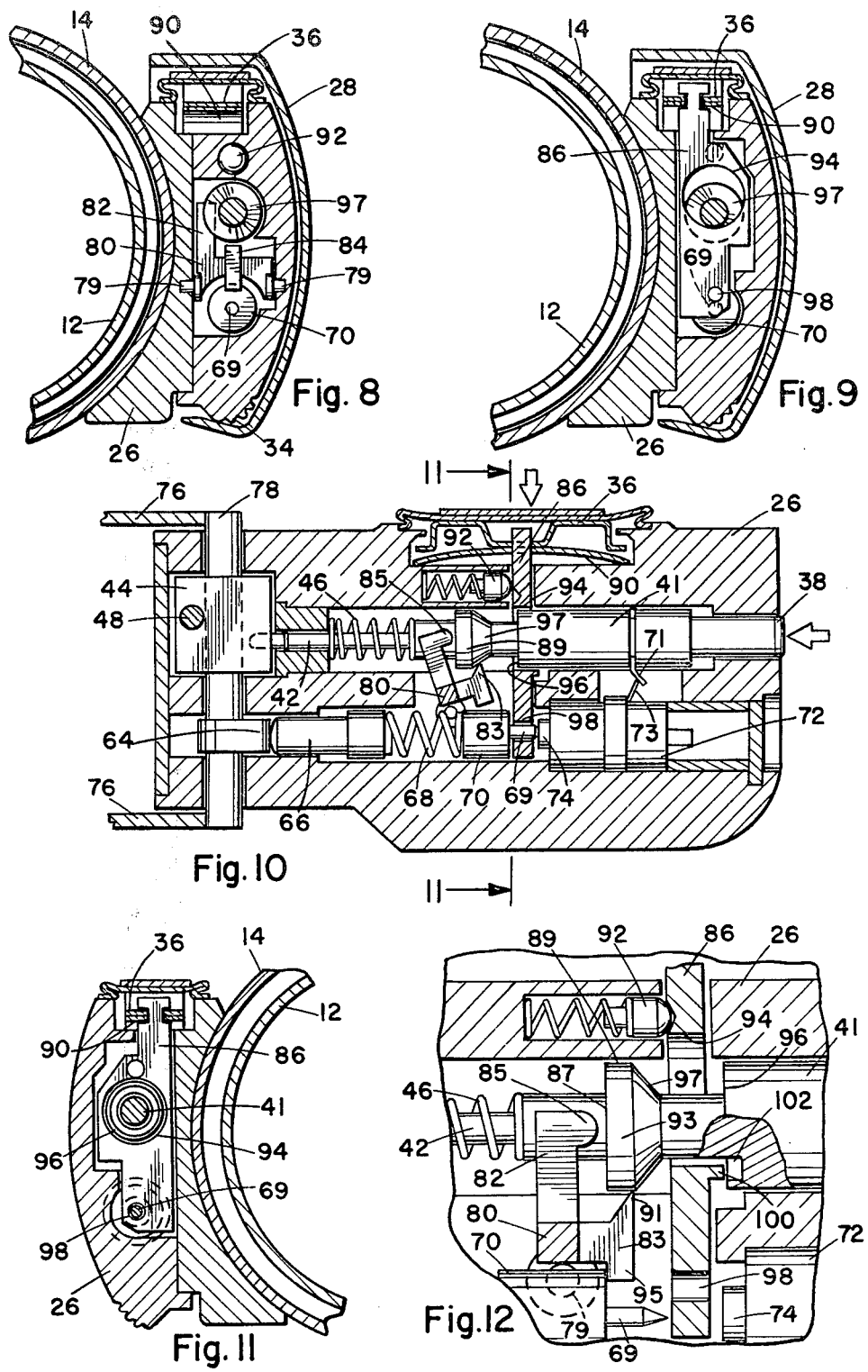

FIRING MECHANISM FOR ROCKET LAUNCHERS

The Government has rights in this invention pursuant to Contract No. DAAK40-76-C-0658, awarded by the U.S. Army.

BACKGROUND OF THE INVENTION

The advent of folding fin stabilized rockets which can be fired by one man from a light weight portable launcher has greatly increased the fire power and combat effectiveness of infantry units against tanks, armored vehicles, and other targets. Because of their use under adverse combat conditions, such launchers must be convenient to carry, rugged, and quickly and easily fired. To be made available in large numbers within cost limitations, they must also be relatively inexpensive weapons that are discardable after use.

Percussion activated thermal batteries are convenient to use in the firing mechanism of such launchers to provide the electrical impulse for arming the warhead and igniting the rocket motor because of their size, effectiveness, and adaptability. Due to the great destructive power available in the rocket and its warhead, and the adverse conditions under which it is carried and used, it is of paramount importance that the activation of the thermal battery and resultant firing of the rocket be safe from accidental activation due to rough handling, component failure, and inadvertent or improper operation by the operator. It is desirable, therefore, to have a firing mechanism for portable rocket launchers that provides maximum safety against inadvertent or accidental activation of its thermal battery by the design, arrangement, and sequence of its operation, while at the same time being easily aimed and fired. It is also desirable in the sequencing of such firing mechanisms that components return to a safe condition automatically and without operator attention in the event of an abort in firing. The firing mechanism disclosed in this application meets the above requirements.

SUMMARY OF THE INVENTION

According to the invention, a firing mechanism has been devised for use with portable rocket launchers wherein energy to initiate firing of a rocket within the launcher is not present until intentional initiation of the firing sequence. Additionally, the design and arrangement of the firing mechanism components directly protects against accidental or inadvertent firing of the rocket until the firing sequence is properly completed.

In the exemplary embodiment, the firing mechanism is a device consisting of various mechanical and electrical components enclosed in a light weight, high impact-resistant housing made of glass reinforced polycarbonate that is mounted on the side of a two-section, telescoping, tubular rocket launcher made of glass reinforced epoxy. It is recognized, however, that other materials could be used. The mechanism is provided with a cover which protects the firing controls when in place and is rotatably hinged at the muzzle end of the housing. Within the housing is contained a percussion activated thermal battery to supply electrical power to arm the warhead and ignite its rocket motor for launching from the extended launcher tube. The thermal battery is activated by a spring driven firing pin in line with the battery percussion primer element. The disclosed firing mechanism embodiment provides for enhanced safety by use of a normally relaxed firing pin spring. The firing pin spring is compressed by a cam mounted on the firing mechanism cover hinge so that the spring is not placed in compression until the firing mechanism cover is rotated to the open position preparatory to the firing of the rocket.

A spring biased trigger release assembly is linearly mounted within the housing above the thermal battery and firing pin and is operationally connected to the former element by a sear that restrains the firing pin. The design of the embodiment provides for a compact mechanism, and permits the use of a multi-function, lever operated, safety plate that normally prevents travel of the trigger mechanism and the firing pin. Not until the safety lever is fully depressed by the operator, aligning apertures in the safety plate can the trigger mechanism move to release the firing pin sear or the firing pin striker contact the battery primer element.

To further maintain the discipline of the firing sequence by requiring the operation of the safety lever before the trigger is operated, the safety plate is provided with an interlock stub which engages an annular groove in the trigger actuator to prevent movement of the safety lever and plate if the trigger is depressed before the safety plate is in the firing position.

It is a primary object of the invention to provide a new and improved firing mechanism for portable rocket launchers. The firing mechanism disclosed provides enhanced safety by employing a design in which energy for initiation of rocket start up is not present within the firing mechanism until the firing sequence is consciously begun. Additional safety interlocks integrated within the firing mechanism provide protection against inadvertent or accidental firing of the rocket in the launcher. The firing mechanism is simple to operate. It is also a compact, rugged and light weight structure. The firing mechanism disclosed is relatively inexpensive and has long shelf life.

Other objects and advantages of the invention will become more apparent upon reading of the following detailed description together with the drawings, in which like reference numerals refer to like parts throughout and in which:

FIG. 1 is a side elevation view of a rocket launcher incorporating the firing mechanism.

FIG. 2 is a top plan view of the launcher and firing mechanism.

FIG. 3 is an enlarged sectional view taken on line 3—3 of FIG. 1, showing the method of gripping the firing mechanism.

FIG. 4 is a sectional view taken on line 4—4 of FIG. 3.

FIG. 5 is a sectional view taken on line 5—5 of FIG. 4.

FIG. 6 is a sectional view taken on line 6—6 of FIG. 4.

FIG. 7 is a sectional view similar to a portion of FIG. 5, showing the release of the trigger mechanism by extending the telescopic launcher tube.

FIG. 8 is a sectional view taken on line 8—8 of FIG. 4.

FIG. 9 is a sectional view taken on line 9—9 of FIG. 4.

FIG. 10 is a sectional view similar to FIG. 4, showing the mechanism in the fired position.

FIG. 11 is a sectional view taken on line 11—11 of FIG. 10.

FIG. 12 is an enlarged sectional view similar to a portion of FIG. 4, showing the trigger safety interlock.

DETAILED DESCRIPTION OF THE DRAWINGS

The configuration of the portable launcher 10 is illustrated in FIGS. 1 and 2. The launcher consists of two hollow thin walled tubes made from high impact resistant glass reinforced plastic. Inner tube 12 is housed within outer tube 14 when launcher 10 is in its carrying position, and is extended from outer tube 14 for firing. End cap 16 seals the aft end of the tubes, and is removed before firing. The rocket, not shown, is stored within the outer launch tube 14 as a ready round requiring only receipt of an electrical impulse from the firing mechanism for launching.

Launcher 10 is portable and can be carried, aimed, and fired by one person. The launcher 10 is discarded after firing of the contained rocket. Rear sight 18 and front sight 20 are provided for aiming the launcher 10. Tube extension latch 24 and folding shoulder stop 22 implement tube extension and handling of the launcher.

The firing mechanism 25 is contained within housing 26, FIG. 3, and is attached to the side of the outer tube 14. The housing 26 is provided with a hinged housing cover 28 which opens toward the muzzle end 30 of launcher 10. Rear sight enclosure 17 is mounted adjacent to firing mechanism 25 and has a cover 19. Cover 19 has a tongue 21 that projects from the side of cover 19 and fits under the upper edge of firing mechanism housing cover 28 to lock the sight cover closed until cover 28 is opened by the operator. When housing cover 28 is opened, sight cover 19 is unlocked and is opened by a spring, allowing rear sight 18 to erect. As will be subsequently described, housing cover 28 serves to protect the firing controls of the firing mechanism when in its closed position, and the rotation of cover 28 to the open position plays a major role in the arming sequence of the firing mechanism 25.

FIG. 3 illustrates the firing mechanism 25 mounted on the exterior of the outer tube 14 with the housing cover 28 rotated to its open position. The outer exterior surface 32 of the firing mechanism 25 is curved to fit the hand and fingers of the weapon operator, and its lower portion 34 is contoured to fit securely into the palm of the operator. As illustrated in FIG. 3, this configuration permits the operator to establish a firm grip with his right hand upon the firing mechanism 25 while aiming the launcher 10, and at the same time permits convenient control of the safety lever 36 and the trigger button 38 with the fingers and thumb of the hand. When housing cover 28 is closed, as shown in FIG. 2, the safety lever 36 and the trigger button 38 are fully covered and protected from accidental damage during transport and handling and from inadvertent operation.

The principal functionally integrated components of firing mechanism 25 and their arrangement are illustrated in FIG. 4 as they would be viewed from a position inside the bore of the launcher tube 14 looking radially outward. In FIG. 4, the firing mechanism components are illustrated in their safe or pre-use configuration with the cover 28 closed. A trigger assembly 40 is supported in housing 26 and consists of a trigger actuator 41, one end of which serves as an exposed trigger button 38. The opposite end of actuator 41 terminates in a trigger shaft extension 42 which cooperates within an inner launch tube cam slide lock 44 as will be subsequently described to prevent movement of actuator 41 unless inner tube 12 is extended from launcher outer tube 14. The trigger actuator 41 is biased to the safe or non-fire position, by trigger spring 46.

The inner launch tube interlock is illustrated in greater detail in FIGS. 5 and 7. Referring to FIG. 5, the interlock is illustrated in its safe condition. Cam slide lock 44 is a cup shaped member having a plunger 48 extending from its base and projecting through an aperture 50 in the firing mechanism housing 26 and an aperture 52 in the outer launch tube 14. A cam slide 54 positioned on the exterior surface of the inner launch tube 12 bears against the bevelled end of slide lock plunger 48 when the inner launch tube 12 is retracted. Cam slide 54 forces slide lock 44 outwardly into the firing mechanism against slide lock spring 56. When in this position, the base 58 of slide lock 44 physically blocks linear travel of the trigger shaft extension 42, preventing movement of trigger actuator 41. The inner tube interlock is illustrated in its firing position in FIGS. 7 and 10. Inner launch tube 12 has been extended from outer launch tube 14 moving cam slide 54 out of engagement with plunger 48. Slide lock spring 56 forces slide lock 44 inward to align the opening 60 in cam slide lock 44 with the trigger shaft extension 42. As a result, the interlock is freed to permit movement of the trigger shaft extension 42 and trigger actuator 41, if the other safety features of firing mechanism 25 permit.

Referring to FIG. 4, a firing pin assembly 62 is supported in housing 26 spaced just below trigger assembly 40. The components of assembly 62 are arranged linearly with respect to one another and include a firing pin cam 64, cam follower 66, firing pin spring 68, firing pin 70, and a thermal battery 72 having a percussion primer 74. When activated, thermal battery 72 provides the electrical impulse to arm and fire the rocket contained within launcher 10. Firing pin spring 68 stores no energy to activate the firing pin assembly 62 prior to the opening of cover 28 of the firing mechanism 25 by the launcher operator, and thus provides an inherent safety feature for pre-use storage and handling of the loaded rocket launcher 10. As can be seen in FIG. 4, the ends 76 of housing cover 28 are secured to a pivot pin 78 such as to cause it to rotate when the cover 28 is opened. As depicted in greater detail in FIG. 6, rotation of pin 78 causes rotation of firing pin cam 64 which through cam follower 66 causes compression of the firing pin spring 68 against the constrained firing pin 70. Only when this is done is the firing pin assembly 62 ready for firing. Reclosing firing mechanism cover 28 removes the compression in spring 68.

This design, in which the firing pin spring is relaxed until initiation of the firing sequence, not only increases the safety of the firing mechanism during storage and field handling, but also provides a more reliable installation since a spring normally in stress is more apt to break over a period of time.

Referring to FIGS. 4 and 8, trigger assembly 40 and firing pin assembly 62 are functionally connected by the sear 80 which is rotatably mounted in the housing 26 on pins 79. As illustrated in FIG. 8, the sear 80 is formed as a yoke shaped member having a trigger arm 82 and a firing pin latch 84 arranged at 90° to one another, and rotatably about pins 79. As indicated in FIG. 12, the trigger arm 82 has a nub 85 which is spaced adjacent to a flat vertical section 87 of the sear collar 89 located on trigger actuator 41. Sear firing pin latch 83 has an extension 91 the end of which rides on a cylindrically formed face 93 of sear collar 89. Latch 83 has a second extension 95 which is engageable with firing pin 70 to prevent movement of the firing pin. The design is such that the firing movement of trigger actuator 41 will first clear the interference between extension 91 and actuator collar 89 by allowing the end of the extension to ride on the conical shaped face 97 of sear collar 89. Further movement of trigger actuator 41 will then cause rotation of the sear trigger arm 82 and release firing pin 70. The cooperative relationship of sear 80 with sear collar 89 also causes firing pin 70 to be relatched should the trigger button 38 be released before firing since trigger spring 46 will return trigger actuator 41 to its original position.

To establish further protection against accidental ignition of the rocket within the launcher 10, provision is made for the electrical isolation of the output of thermal battery 72 from the rocket ignition circuitry until just prior to intentional firing. This safety feature is illustrated in FIGS. 4 and 10 and is provided by an electrical switch formed by the moving contact 71 located by the trigger actuator 41, and a fixed contact 73 attached to the casing of thermal battery 72. The placement and orientation of switch contacts 71 and 73 is such that the contacts are closed by the firing movement of trigger actuator 41 just before sear 82 is rotated to release firing pin 70. The electrical connection between the output of the thermal battery 72 and the rocket (not shown) is conventional and therefore is not further discussed herein.

Safety plate 86 is vertically interposed in the way of trigger assembly 40 and firing pin assembly 62, as illustrated in FIGS. 4 and 9, to allow ignition of the rocket only when safety lever 36 is depressed by the launcher operator against the bias of safety spring 90. Detent 92 further serves to maintain safety plate 86 in its safe position against inadvertent operation, and to act as a tactile indication to the operator of safety plate movement. The functioning of safety plate 86 is more fully depicted in FIG. 9. Plate 86 contains a trigger aperture 94 that is normally misaligned with the trigger actuator shoulder 96 (FIG. 12), and a firing pin aperture 98 that is misaligned with the firing pin striker 69 when the safety plate 86 is in its upper, or safe position. When the safety plate is depressed to its armed position as illustrated in FIGS. 10 and 11, apertures 94 and 98 are aligned with and permit the passage of the trigger actuator shoulder 96 and the firing pin striker 69 through the safety plate. An important additional safety feature relating to the safety plate 86 operation is illustrated in FIG. 12. To avoid an untimely or unexpected firing of a rocket should the operator consciously or unconsciously depress the trigger button 38 before depressing safety lever 36, the safety plate 86 cannot be moved. This result is achieved by providing a stub 100 that projects toward and fits into an annular groove 102 in trigger actuator 41 if the latter is depressed when the safety plate in its raised or safe position.

OPERATION

For firing mechanism 25 to cause electrical power of thermal battery 72 to be applied to the rocket contained within launcher 10, firing pin spring 68 must be compressed to provide energy to propel firing pin 70 into the battery primer element 74, and the firing switch contacts 71 and 73 must be closed. These two fundamental safety constraints can only be met by conscious and intentional effort on the part of the operator in following the design firing sequence. In the safe condition, as illustrated in FIG. 4, the firing pin 70 is prevented from striking the battery primer element 74 because spring 68 is not compressed, the firing pin 70 is restrained by sear 80 and the safety plate 86 blocks the path of striker 69.

When the weapon operator opens the housing cover 28, the first firing pin restraint is removed by the compression of spring 68 through the action of cam 64. Energy is available to propel the firing pin 70. Opening the housing cover 28 also exposes the safety lever 36 and the trigger button 38 for the operator's use. The sear 80 and safety plate 86 are still in their normally safe positions.

Movement of the trigger actuator 41 is further prevented by the cam slide lock 44 until inner tube 12 is fully extended. Additionally, misalignment of the aperture 94 in safety plate 86 (FIG. 9) prevents movement of the actuator 41 into the housing, and the bias of spring 46 directly on trigger actuator 41 holds it in a safe position. When the housing cover 28 is opened and the inner tube 12 extended, the launcher 10 is ready to be aimed at the target and fired. When the safety lever 36 is depressed, only the trigger spring 46 bias needs to be overcome by the operator to release the firing pin since the same motion of the safety plate 86 that permitted movement of trigger actuator 41 also aligns safety plate aperture 98 with the firing pin striker 69 and the battery primer 74. As the trigger actuator 41 is pressed into the housing by operator pressure on trigger button 38, it passes through aligned aperture 94 in the safety plate 86, over the cam slide lock 44, clears the sear interference between sear extension 91 and sear collar 89 (FIG. 12), closes switch contacts 71 and 73, and then rotates sear 80 to release the firing pin 70 (FIG. 10). Firing pin 70 is then propelled by the stored energy in the firing pin spring 68 through safety plate aperture 98 and into the battery primer 74.

If the operator chooses to abort the firing, he only has to release his pressure on trigger button 38 and safety lever 36, and the firing mechanism will return to safe condition. The inclined face 97 of sear collar 89 of the trigger actuator 41 forces the sear 80 back to its latched position, through the force of the trigger spring 46. When trigger actuator 41 has returned to its original position, the safety plate 86 is snapped back to its safe position by spring 90.

A sequential interlock between the safety plate 86 and trigger actuator 41 insures that the operator must depress the safety lever 36 before operating trigger button 38.

Having described our invention, we claim:

1. A firing mechanism for an operator-portable rocket launcher having a battery, activated by a percussion primer, for arming and igniting a rocket loaded within said launcher, comprising:

a housing attachable to a launcher, a housing cover pivotably mounted on said housing, firing means for storing the energy needed to activate a battery when said housing cover is opened, trigger means for releasing the energy stored in said firing means, sear means comprising a spring biased pivotable sear for restraining the release of the energy stored in the firing means until said sear is rotated by the trigger means, switch means in cooperative relationship with said trigger means for electrically isolating the output of said battery until the operation of said trigger means, repositionable safety means for simultaneously blocking the operation of said trigger means and said firing means in a first position, and permitting the operation of said trigger means and said firing means in a second position.

2. A firing mechanism as recited in claim 1 further comprising:

interlock means for preventing operation of said safety means if said trigger means is operated before said safety means.

3. A firing mechanism as recited in claim 1, wherein:

said trigger means and said safety means are positioned adjacent one another and are simultaneously operable by the operator.

4. A firing mechanism as recited in claim 1, wherein:

said housing cover encloses said trigger means and said safety means for preventing inadvertent operation when said cover is closed.

5. A firing mechanism as recited in claim 1 for use on an extendable barrel launcher wherein the trigger means includes:

launcher interlock means for preventing movement of said trigger means until the barrel of the launcher is fully extended.

6. A firing mechanism as recited in claim 1 wherein the firing means comprises:

a cover pivot shaft mountable in said housing and rotatable by the opening and closing of said cover, cam means on the pivot shaft and rotatable therewith, latent spring means compressible by said cam means when said cover is rotated to its open position, firing pin means positioned to be driven by said latent spring means for impacting a battery primer when said firing means is released by said sear means.

7. A firing mechanism as recited in claim 6 wherein:

said sear means has an extension means for mechanically preventing rotation of said sear means until said trigger means has moved a predetermined distance.

8. A firing mechanism as recited in claim 7 wherein:
said firing pin means is relatchable by said sear extension means upon a firing being aborted.

* * * * *